United States Patent [19]

Bevan et al.

[11] 4,088,790

[45] May 9, 1978

[54] REDUCING RECONSTITUTION TIME OF DEHYDRATED VEGETABLES WITH PHYTATE

[75] Inventors: David William Bevan, Renhold; Michael Willam Clarke, Wellingborough; Derek Robin Haisman, Ravensden; Sydney Pendlington, Bromham, all of England

[73] Assignee: Lever Brothers Company, New York, N.Y.

[21] Appl. No.: 680,329

[22] Filed: Apr. 26, 1976

Related U.S. Application Data

[60] Continuation of Ser. No. 540,049, Jan. 10, 1975, abandoned, which is a division of Ser. No. 410,068, Oct. 24, 1973, abandoned, which is a continuation of Ser. No. 117,075, Feb. 19, 1971, abandoned.

[30] Foreign Application Priority Data

Mar. 10, 1970  United Kingdom ............... 11413/70
Mar. 10, 1970  United Kingdom ............... 11414/70

[51] Int. Cl.² .............................................. A23L 1/20

[52] U.S. Cl. ...................................... 426/96; 426/102; 426/302; 426/557; 426/589; 426/634; 426/640; 426/458

[58] Field of Search ........................................ 426/589

[56] References Cited

U.S. PATENT DOCUMENTS

| 2,709,657 | 5/1955 | Campbell | 426/544 |
| 2,738,280 | 3/1956 | Makower | 426/268 |
| 2,987,401 | 6/1961 | Johnston | 426/267 |
| 3,025,171 | 3/1962 | Schroeder | 426/589 |
| 3,108,884 | 10/1963 | Nielsen | 426/634 |
| 3,337,349 | 8/1967 | Savage | 426/634 |
| 3,591,665 | 7/1971 | Kimura | 426/271 |
| 3,635,728 | 1/1972 | Rockland | 426/634 |

*Primary Examiner*—Jeanette M. Hunter
*Attorney, Agent, or Firm*—Melvin H. Kurtz

[57] ABSTRACT

Dried vegetable materials can be rendered quick cooking if the vegetable is reconstituted in the presence of phytate ions. The phytate can be applied for example as a sodium salt of phytic acid to the vegetable either by impregnation before the vegetable is dried or by surface contact after the vegetable is dried.

8 Claims, No Drawings

REDUCING RECONSTITUTION TIME OF DEHYDRATED VEGETABLES WITH PHYTATE

This is a continuation of application Ser. No. 540,049, filed Jan. 10, 1975 now abandoned which is a division of Ser. No. 410,068, filed Oct. 24, 1973, abandoned; which is a continuation of Ser. No. 117,075, filed Feb. 19, 1971, abandoned.

The invention relates to dried foodstuffs consisting of or derived from vegetables including pasta, cereals, fruit, green vegetables and root vegetables. More particularly the invention is concerned with dried pulses such as peas or beans, dried root or tuberous vegetables such as carrots and potatoes, dried whole kernal corn and other cereals and to products such as pasta which are made from cereal flour.

The term "vegetable" as used in this specification is intended to include any of the aforementioned foodstuffs as well as other foodstuffs consisting of or derived from vegetable material. The vegetable can be whole or in the form of pieces, such as dice or slices or shapes cut from whole vegetable or shaped from powdered or finely divided vegetable, such as for example, pasta pieces.

Vegetables in the fresh state, if not required for immediate consumption can be dried in order to prevent chemical and microbiological deterioration. When required for consumption, they can then be reconstituted by soaking and cooking in water. The period of time taken to reconstitute may be considerable, even if boiling water is used, and this delay may be inconvenient to the consumer. For example, a dried soup mix containing pieces of vegetables after dispersing in water and heating to boiling may have to be simmered for up to 15 to 20 minutes, in order to reconstitute the dried pieces whereas any powdered ingredients will generally reconstitute rapidly. Also, if some of the vegetable components of a composite dried food dish, such as the carrots or peas or a dried meal, take considerably longer to reconstitute than other components, the prolonged rehydration of the slow reconstituting vegetables may lead to over-cooking of the more rapidly rehydrated components of the dish.

We have now found that the reconstitution time of dried vegetables, especially pieces of dried vegetable, can be reduced if they are reconstituted in the presence of phytate ions.

Accordingly, the invention provides a quick cooking dried vegetable comprising in combination a dried vegetable and an amount of water-soluble phytate sufficient to improve the reconstitution of the vegetable when prepared for consumption. The invention also provides a process for preparing quick cooking dried vegetables which comprises the step of contacting the vegetable with water-soluble phytate.

The phytate may be provided in the form of phytic acid, also known as inositol hexaphosphoric acid and having the structure

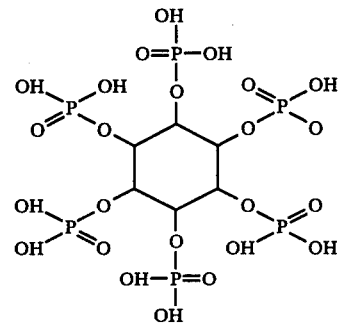

but it is preferred to use an alkali metal salt of phytic acid for example, sodium phytate or a mixed alkali metal/hydrogen salt of phytic acid such as for example hexasodium hexahydrogen phytate, octasodium quadrihydrogen phytate or nonasodium trihydrogen phytate.

The phytate may also be provided in the form of a mixed alkali metal/alkaline earth metal/hydrogen salt of phytic acid, such as for example hexasodium monocalcium quadrihydrogen phytate, octasodium monocalcium dihydrogen phytate or nonasodium monocalcium monohydrogen phytate.

The phytate may be applied to the vegetable before, during or after dehydration of the vegetable. Thus, for example, the phytate may be applied as an aqueous solution or dispersion to the vegetable in the fresh state or at some time before drying is commenced. A phytate solution or dispersion may alternatively be applied to the vegetable while in a dried or partly dried state.

As a further alternative procedure, phytate in the form of a dry solid may be applied to the vegetable before, during or after it has been dried.

As yet a further alternative procedure, the phytate may be provided in a "physically bound" form which renders it not immediately available to the vegetable, but which enables it to be released in a suitable form when the dried vegetable is reconstituted and cooked in water. An example of "physically bound" phytate is phytate in solid, dissolved or dispersed form separated from the vegetable by encapsulation.

The quantity of phytate with which the vegetable is contacted will depend at least partly on (i) whether the vegetable is in a fresh or dehydrated state when the phytate is applied,
(ii) the species or type of vegetable and its state of subdivision,
(iii) whether the phytate is applied as a solid, a solution or a dispersion, and
(iv) other factors such as temperature and pH.

When the vegetable is contacted with phytate before the vegetable is dried, it is important to ensure that phytase, the enzyme which destroys phytate and which occurs naturally, for example, in many fresh vegetables if present is destroyed. This can be achieved, for example by blanching the vegetable with hot water or with steam. The phytase-free vegetable can then be contacted with phytate, preferably in the form of an aqueous solution, under conditions such that the vegetable is impregnated with at least 0.005 mole phytate per kg vegetable solids (on dry weight basis). Preferably, the amount of phytate incorporated in the vegetable is from 0.01–0.02 mole expressed on a similar basis.

The impregnated vegetable can then be dried by any convenient means such as by air drying or freeze drying or by application of a combination of these drying techniques.

The dried impregnated vegetable can thus be reconstituted more rapidly to achieve a more tender texture than that obtained when phytate impregnation is not employed. The dried impregnated vegetable can be reconstituted in a solution of phytate as a supplement to phytate introduced into the vegetable by impregnation prior to drying. The amount of phytate initially introduced into the vegetable by impregnation can, in these circumstances, thus be lower than that stated above, provided that the total phytate content of the vegetable after reconstitution is at least 0.005 mole, preferably 0.01–0.02 mole per kg vegetable solids.

When the vegetable is to be contacted with phytate after the vegetable has been finally dried, i.e. dried to an extent that it may be packaged for subsequent use without further need for other preservative measures such as deep freezing, the phytate can be applied superficially to the vegetable as a solid or in some other form, for example in an encapsulated form such that the phytate becomes available for impregnation of the vegetable during reconstitution of the vegetable. The phytate can for example, thus be provided as a superficial dusting to the dried vegetable or as a tablet for inclusion in the packed dried vegetable or an encapsulated solid or solution for inclusion in the packed dried vegetable.

The phytate can alternatively be provided as an aqueous solution to which the vegetable is transferred for reconstitution.

Whether the phytate is provided as a dry additive to the dried vegetable, or whether the phytate is provided as a solution in which the dried vegetable is reconstituted and cooked, as a general guide we have shown that sufficient phytate contacts the vegetable to render it quick cooking if the vegetable in a fully dried state is cooked in water effectively containing phytate in solution at a concentration of at least 0.1 mM, preferably from 1.0–6.0 mM. This is equivalent approximately to at least 0.017% w/v, preferably from 0.17–1.02% w/v sodium phytate having 11.0% phytate phosphorus.

If hydrated phytate is employed to prepare a solution of phytate, due allowance should be made to take account of water of crystallisation in selecting the correct amount of phytate to be used. It appears that use of a solution of phytate under these conditions having a concentration of more than this upper value of 6.0 mM does not appreciably increase the rate at which the vegetable softens beyond that observed using a 3.0 mM solution of phytate. The texture and appearance of the vegetable is also not appreciably improved by the use of a concentration in excess of this value.

We have found in particular that the quantity of water that enters the dried vegetable during reconstitution in the presence of phytate, as well as its rate of entry, is influenced by the pH of the reconstituting medium. The rate and degree of reconstitution under alkaline conditions is thus, for example, not so marked as when an initial pH nearer 7 is employed. As an example, dried green peas can be partially reconstituted by cooking for a total of 9 minutes in a 0.5% w/v solution of hydrated sodium phytate. The pH of this solution is initially 10.8 and drops to 8.8 after cooking for this time but it is clear that reconstitution is incomplete. If on the other hand, similar peas are cooked in a solution of a similar phytate concentration, the pH of which has initially been lowered to 7 with a suitable edible acid such as hydrochloric acid or citric acid or by use of a solution containing a mixed metal/hydrogen salt of phytic acid the same cooking conditions yield a product which is fully hydrated and more succulent and otherwise organoleptically more acceptable than that cooked at the higher pH.

It has been observed however that when phytate contacts the vegetable before the vegetable is dried for example, when the vegetable is in a fresh state, the pH of the contacting solution used is not critical to the quality of the vegetable after subsequent dehydration and ultimate reconstitution and cooking for consumption, provided that the pH is within the range of about 7.0–11.0.

In whatever form and at whatever stage in the process the phytate is applied, it is desirable that the vegetable, by the time it is reconstituted, should contain at least 0.005 mole, preferably from 0.01–0.02 mole phytate per kg vegetable solids (on dry weight basis), in addition to any phytate that may occur naturally in the vegetable.

A convenient method of determining the phytate content of a vegetable is that described by Crean D E C & Haisman D R, J.Sci.F & Agric., 1963, 11, 824.

The invention can be used to improve the texture and other properties of any vegetable reconstituted from the dried state, but it is particularly applicable to pulses such as peas and beans, to whole kernel corn and to other cereals, and to root or tuberous vegetables such as carrots and potatoes in the form of pieces such as dice or slices. The invention can also usefully be applied to pasta products and to restructured or retextured products made from vegetables.

The invention may be employed in conjunction with the use of other materials such as sugar, salt or flavouring materials which can be provided to contact a fresh vegetable before drying or a dried vegetable during its reconstitution with water. The invention may thus, for example, be employed in conjunction with the processes described in British patent specification Nos. 1,004,522 and 1,017,519.

The invention may also usefully be employed in conjunction with the processes described in British patent specification No. 783,974, in which the skin of a pulse is ruptured before the pulse has been dried.

A particularly preferred embodiment of the invention is directed to the preparation of dried green peas which require only a few minutes cooking in water to prepare them for consumption. According to this embodiment, green peas having a Tenderometer Value not exceeding 120 are subjected to a skin rupture operation in which the skins of substantially all peas in a batch are ruptured, for example, by pricking with a pin or by slitting with a knife. The peas are then blanched with steam or hot water and subsequently dried by air drying in a through draught drier at a temperature of 65° C. The dried peas are then packed into 100 gm batches together with 3.75 g hydrated sodium phytate (11% phytate phosphorus) in the form of a powder. In order to prepare the peas for consumption, the pack contents are transferred to 1.25 liters of cold water which is brought to the boil and allowed to simmer for 5 minutes, after which time the peas are fully cooked. This procedure is equivalent to cooking the dried peas in a 0.3% w/v solution of hydrated sodium phytate.

A further embodiment of the invention is direct to the preparation of a dried vegetable soup mix containing carrots, peas, cabbage, green beans, onions, turnips and other vegetables including pasta products as desired. The vegetables are subdivided where necessary to a particle size suitable for inclusion in vegetable soup mix and the particles are then dried and packaged in the manner and in quantities usual for this type of product. Also included in the pack is sufficient hydrated sodium phytate powder to form a 0.5% solution (approximately 3.0 mM) when the soup mix contents are transferred to water for cooking. The soup may then be prepared by simmering the soup mix ingredients in water for about 5 minutes or less.

The invention is further illustrated by reference to the following Examples.

EXAMPLE 1

This Example concerns the preparation of quick cooking dried green peas and illustrates the effect of phytate ions on their cooking time.

Preparation of Samples

Freshly harvested green peas having a Tenderometer Value of 95-110 were pricked and dried according to the process described in British patent specification No. 783,954. The dried peas were packed in 200 g lots, each pack also containing a quantity of solid hydrated sodium phytate (11.1% phytate phosphorus).

The contents of each pack were later transferred to a saucepan containing 2580 ml warm distilled water containing 8 g sucrose and 8 g sodium chloride. The contents of the saucepan were brought to the boil and simmered for 5 minutes (total cooking time 9 minutes).

After cooking, the peas were strained in a colander which was then immersed in a large beaker of cold water into which was placed the free end of a piece of tubing attached to the cold water tap so that the peas were cooled by upward movement of water thus minimising damage during cooling. After 1 minute cooling the peas were drained for 5 minutes to remove excess water.

Freshly harvested green peas from the same batch were pricked, dried, packed, cooked and cooled as described above except that the phytate was omitted and the simmering continued for 20 minutes instead of 5 minutes (total cooking time 24 minutes). (Control)

Methods of Testing Cooked Samples

Texture

The texture of cooked peas was assessed using a Kramer shear press, fitted with a C.S.I. standard shear compression cell, at a speed of 1.95 cm/sec. (A. Kramer, G. J. Burkhardt, H. P. Rogers; 1951, Canner 112 (5), 34-40).

Colour

The colour of the cooked peas was determined as follows:

A 50g sample of cooked peas was placed in a 500 ml glass bottle and blended with 250 ml of acetone for 2 minutes. The comminuted extract was filtered through a No. 1 sintered glass funnel and the residue was re-extracted with first 50 ml of acetone and then 100 ml of acetone. The three extracts were then bulked and clarified by centrifugation at 10,000 rpm for 10 minutes at room temperature. Each extract was then scanned in a spectrophotometer between a wave length of 350m$\mu$ and 700m$\mu$ using a 5 mm cell. The residue was dried to a constant weight in a vacuum oven at 80° C over phosphorous pentoxide and weighed so that an accurate estimation of the amount of material used could be found and the appropriate correction applied to the results. It was important to standardise the time taken to extract and measure the pigment present because they are unstable to light. This time was standardised at 30 minutes.

Results

Texture

The variation of texture compared with the quantity of sodium phytate used against a control without added phytate, is shown in Table 1.

Table 1

| Sample | Hydrated Sodium Phytate Added to pack (g) | Total Cook* mins | Kramer Shear Press Reading (lb) | Standard Error of the estimate |
|---|---|---|---|---|
| Control | NIL | 24 | 166.4 | ±3.3 |
| Test A | 7.8 | 9 | 87.6 | ±1.0 |
| B | 10.3 | 9 | 81.7 | ±1.0 |
| C | 12.9 | 9 | 76.0 | ±1.9 |

*in 258C ml distilled water containing 8 g sucrose and 8 g sodium chloride

The toughest sample was the control after the normal cooking time of 24 minutes which is considered appropriate to obtain a tender sample. It will be observed that even the smallest quantity of phytate used achieved a greater tenderness than the control after the shortened cooking time of 9 minutes.

Colour

The loss of green colour which normally follows reconstitution and cooking of dried peas was compared with that observed when the peas were contacted with phytate. Both values were compared with the colour of uncooked fresh peas. The results are shown in Table 2.

Table 2

| Sample | Hydrated Sodium Phytate Added to pack (g) | OD at 660m$\mu$/100g (average of 3 samples) | loss of colour |
|---|---|---|---|
| uncooked reference | NIL | 56.30 | NIL |
| Control (cooked for 24 minutes) | NIL | 34.05 | 39.53 |
| Test B (cooked for 9 minutes) | 10.3 | 47.64 | 15.39 |

From these results it can be seen that there is an overall colour loss of 40% when the peas are cooked for 24 minutes in distilled water, whereas when hydrated sodium phytate was present, the loss was 15 after a 9 minute cook.

Organoleptic Assessment

Dried peas which had been treated with phytate and cooked for a total of 9 minutes were compared by a small panel of trained tasters with a control sample prepared without phytate and cooked for 24 minutes. The findings of this panel may be summarised as follows:

1. It was difficult to distinguish between phytate-treated sample and the control as far as the texture was concerned;
2. It was possible to pick out the phytate on flavour but it was considered by the panel not to be unacceptable. There were considerable colour differences between the phytate treated sample and the control sample, the former having a better colour.

EXAMPLE 2

The procedure described in Example 1 was repeated except that the dried peas from each pack were transferred to a saucepan containing 2580 ml warm distilled water containing 8 g sucrose and 8 g sodium chloride, the pH then being adjusted to 7.0 by the addition of N hydrochloric acid.

Table 3

Results

Texture

| Sample | Hydrated Sodium Phytate Added to pack (g) | Total Cook (mins) | Kramer Shear Press Reading (lb) | Standard error of the estimate |
|---|---|---|---|---|
| Control | Nil | 24 | 166.4 | ±3.3 |
| Test A | 7.8 | 11 | 98.5 | ±1.2 |
| B | 10.3 | 11 | 97.2 | ±1.0 |
| C | 12.9 | 11 | 92.3 | ±1.4 |

EXAMPLE 3

Freshly harvested green peas having Tenderometer Value between 95 and 110 were pricked and blanched for 80 seconds in water at 100° C. The peas were then dipped for 2 minutes in a solution containing 0.5% sodium phytate (11.1% phytate phosphorus), 0.1% sodium sulphite and 0.3% sodium carbonate in distilled water. After draining off surplus solution the peas were dried at 50° C in a moving steam of air until their moisture content was reduced to 10%. The dried peas were cooked as in Example 1 (but in the absence of added phytate) for a total cooking time of 11 minutes.

Freshly harvested peas were prepared as above except that phytate was omitted from the dipping solution. These peas were cooked for a total of 24 minutes (Control).

Organoleptic Assessment

The two cooked samples were compared by a small panel of trained tasters who found that the phytate treated sample of peas which had been given a much shorter cook were as succulent as and more tender than the control sample.

EXAMPLE 4

Large carrots were peeled and diced into 1 cm cubes and washed with distilled water. The washed dice were blanched at 100° C in distilled water containing 0.1% sodium sulphite, 0.3% sodium carbonate and 0.5% hydrated sodium phytate (11.1% phytate phosphorus) for 5 minutes. After blanching the dice were drained, washed briefly with distilled water and then dried at 50° C in a moving stream of air until their moisture content had been reduced to 10%.

A control sample of dried carrot dice was prepared in the same way omitting phytate from the blanching liquid.

Organoleptic Assessment

Both samples were cooked in boiling distilled water. The phytate treated sample was soft and palatable after 5 minutes in boiling water. The control sample required 7 minutes to reach a similar organoleptic condition.

EXAMPLE 5

A dried vegetable soup mix containing mixed dried carrots, celery, bell peppers, green beans, green peas, dry noodles, protein and fat as well as emulsifying salts was prepared, the mixture also containing 0.5% by weight on a total solids basis of hydrated sodium phytate. Sufficient water was added to the dry vegetable soup mix to provide a 0.5% solution of the hydrated sodium phytate, and soup was brought to the boil and simmered gently for 5 minutes.

A control dried vegetable soup mix was also prepared having the same ingredients as the test soup described above except that phytate was omitted. This control soup was prepared in a manner and cooked for a time identical to that of the test soup.

Organoleptic Assessment

The soups were evaluated by a panel of trained testers who found the vegetables in the phytate-containing soup to be tender and otherwise of an excellent appealing texture, while those of the control soup were slightly hard.

What is claimed is:

1. In the process of preparing a dehydrated vegetable product, intended for reconstitution in boiling water by the consumer, said process including the conventional steps of initially blanching the fresh vegetable product to prevent subsequent discoloration, and dehydrating said blanched vegetable product by drying, the improvement comprising reducing the reconstitution time of said blanched, dehydrated vegetable product by contacting the vegetable product with a water-soluble phytate, under such conditions that the blanched, vegetable product is provided with 0.005 mole to 0.02 mole of added water-soluble phytate per kg of vegetable solids, expressed on a dry weight basis.

2. An improved process as claimed in claim 1, in which said water-soluble phytate is contacted with said blanched, vegetable product prior to dehydration by impregnation of the blanched, vegetable product with an aqueous 0.1mM to 6.0mM solution of water-soluble phytate having a pH within the range of 7.0 to 11.0.

3. An improved process as claimed in claim 2, in which said vegetable product is a skin-ruptured green pea, the reconstitution time of which is reduced to not more than 11 minutes.

4. An improved process as claimed in claim 3, in which the water-soluble phytate is selected from the group consisting of phytic acid, an alkali metal salt of phytic acid and a mixed alkali metal/alkaline earth metal salt of phytic acid.

5. An improved process as claimed in claim 1, in which said water-soluble phytate is contacted with said blanched, vegetable product after dehydration, by adding water-soluble phytate to the blanched, dehydrated vegetable product as a dry powder, that is packed with the blanched, dehydrated vegetable product in an amount sufficient to provide when the blanched, dehydrated vegetable product is added by the consumer to cooking water, an aqueous reconstitution medium which is 0.1mM to 6.0mM in water-soluble phytate.

6. An improved process as claimed in claim 5, in which said vegetable product is a skin-ruptured green pea.

7. An improved process as claimed in claim 6, in which the water-soluble phytate is selected from the group consisting of phytic acid, an alkali metal salt of phytic acid, and a mixed alkali metal/alkaline earth metal salt of phytic acid.

8. An improved process as claimed in claim 6, in which said blanched, dehydrated vegetable product is a dried vegetable soup mix containing vegetable pieces selected from carrots, peas, cabbage, green beans, onion, turnips, celery, bell peppers and mixtures thereof.

* * * * *